United States Patent [19]

Tigner et al.

[11] Patent Number: 4,975,496

[45] Date of Patent: Dec. 4, 1990

[54] PROCESS FOR BROMINATING AROMATIC RESINS

[75] Inventors: Ronald G. Tigner, Coleman; Edward R. Falardeau, Midland, both of Mich.

[73] Assignee: The Dow Chemical Company, Midland, Mich.

[21] Appl. No.: 391,823

[22] Filed: Aug. 10, 1989

[51] Int. Cl.$^5$ ............................................... C08F 8/22
[52] U.S. Cl. ........................ 525/357; 525/332.4; 525/333.3; 525/333.4; 525/355; 525/356; 525/359.1
[58] Field of Search ............... 525/355, 357, 359.1, 525/356

[56] References Cited

U.S. PATENT DOCUMENTS

| | | |
|---|---|---|
| 2,199,026 | 4/1940 | Levine et al. . |
| 2,823,201 | 2/1958 | Wheaton . |
| 3,009,906 | 11/1961 | Eichhorn et al. . |
| 3,132,045 | 5/1964 | Hill . |
| 3,506,741 | 4/1970 | Trepka et al. . |
| 4,074,032 | 2/1978 | Naarmann et al. . |
| 4,143,221 | 3/1979 | Naarmann et al. . |
| 4,200,703 | 4/1980 | Diebel et al. . |
| 4,352,909 | 10/1982 | Barda et al. . |
| 4,360,455 | 11/1982 | Lindenschmidt et al. . |
| 4,636,554 | 1/1987 | Tada et al. . |

*Primary Examiner*—Bernard Lipman
*Attorney, Agent, or Firm*—Price, Heneveld, Copper, DeWitt & Litton

[57] ABSTRACT

Styrenic polymers are brominated by a process comprising dispersing at least one Lewis acid catalyst in at least one inert halogenated solvent and contacting said Lewis acid catalyst dispersion with a solution of at least one ring-brominatable styrenic polymer in at least one inert halogenated solvent and at least one brominating agent.

20 Claims, No Drawings

PROCESS FOR BROMINATING AROMATIC RESINS

BACKGROUND OF THE INVENTION

The present invention relates to the bromination of styrenic resins, and is especially directed to the ring bromination of polystyrene. Brominated styrenic resins are used as flame retardants in polymer resin formulations.

Brominated polymers of alkenyl aromatic compounds are useful as flame retardants for thermoplastic resins. There are many known methods for the preparation of ring-brominated polymers of alkenyl aromatic compounds, with most attention directed to the production of brominated polystyrene. Early methods created products wherein many of the aliphatically bonded hydrogen atoms were replaced by bromine atoms. Such products are unsuitable for a number of end uses, as they evolve hydrogen bromide at temperatures of about 180° C. to 250° C. Even when they contain only very small amounts of aliphatically bonded bromine, they develop a dark discoloration at temperatures above 200° C.

The typical procedure for brominating polystyrenes involves dissolving polystyrene having a molecular weight in the range from 100,000 to 250,000 in a chlorinated hydrocarbon solvent, dispersing a Lewis acid catalyst such as iron chloride or aluminum chloride into the solution, and then gradually adding bromine to the solution. Unfortunately, the process is quite slow. The bromination of one gram mole of polystyrene with two gram moles of bromine requires 3½ to 4 hours. Increasing the ratio of bromine to polystyrene slightly requires substantially longer reaction times. At such higher ratios, the bromination of 0.75 gram moles of polystyrene with 1.87 gram moles of bromine requires 5 hours.

Yet another deficiency with the standard process is a tendency for the polystyrene to be incrementally polymerized. Very high molecular weight chunks of polystyrene tend to build up around the catalyst particles. These undesirable particulate materials have to be filtered out before the brominated polystyrene can be used.

When brominated styrenic polymers are employed as flame retardants in thermoplastics, their color is of great interest to the compounder of thermoplastic materials. The compounder desires a white-colored brominated polymer so that the color of the thermoplastic article, or part, into which the brominated aromatic polymer is incorporated is not affected. It would be desirable to have a brominated polymer of an alkenyl aromatic compound of high molecular weight with a white appearance as manufactured and, equally importantly, which can be produced more cheaply and efficiently.

SUMMARY OF THE INVENTION

We have discovered that the foregoing problems can be obviated by introducing a brominating agent and a styrenic polymer solution as separate ingredients into a Lewis acid catalyst suspension, with at least a portion of the brominating agent being dispersed substantially throughout the catalyst suspension before there is any substantial complexing of the styrenic polymer with the catalyst particles. The process time is significantly reduced, substantially less particulate material has to be filtered out upon completion of the process, and the resulting brominated styrenic polymer has a desirable white color.

PREFERRED EMBODIMENT

Styrenic polymers are brominated in accordance with the present invention by contacting under reaction conditions a solution of at least one styrenic polymer with a brominating agent in the presence of a Lewis acid catalyst, wherein both the styrenic polymer and the brominating agent are separately introduced into contact with the Lewis acid catalyst. It is important that the brominating agents and the polystyrene solution be introduced as separate ingredients into contact with the Lewis acid catalyst. This is in contrast to the prior art teaching which adds the brominating agent and the catalyst, either separately or together, into the polystyrene solution. The incorporation of low viscosity solutions/suspensions of brominating agent and catalyst into the more viscous styrenic polymer solutions will typically not yield in the usual prior art bromination processes the surprising and unexpected results achieved by the present invention. The high viscosity of styrenic polymer solutions, even at low resin solids content, is an undesirable facet of prior art brominations.

Styrenic polymers which are brominated in accordance with the present invention are homopolymers and copolymers of vinylaromatic monomers, that is, monomers having an unsaturated moiety and an aromatic moiety. The preferred vinylaromatic monomers have the formula

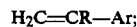

$$H_2C=CR-Ar;$$

wherein R is hydrogen or an alkyl group having from 1 to 4 carbon atoms and Ar is an aromatic radical (including various alkyl and halo-ring-substituted aromatic units), of from 6 to 10 carbon atoms. Examples of such vinylaromatic monomers are styrene, alpha-methylstyrene, orthomethylstyrene, meta-methylstyrene, para-methylstyrene, para-ethylstyrene, isopropenyltoluene, isopropenylnaphthalene, vinyltoluene, vinylnaphthalene, vinyl biphenyl, vinyl anthracene, the dimethyl styrenes, t-butylstyrene, the several chlorostyrenes (such as the mono- and dichloro-variants), the several bromostyrenes (such as the mono- and dibromo-variants). Polystyrene is the currently preferred styrenic polymer and, when the styrenic polymer being brominated is a copolymer of two or more vinylaromatic monomers, it is preferred that styrene be one of the monomers, and that styrene comprise at least 50 weight percent of the copolymerizable vinylaromatic monomers.

The styrenic polymers, which are brominated in accordance with the present invention, are readily prepared by bulk or mass, solution, suspension or emulsion polymerization techniques comparable to those employed in the polymerization of styrene. Polymerization can be effected in the presence of free radical, cationic or anionic initiators, such as di-t-butyl peroxide, azo-bis-(isobutyronitrile), di-benzoyl peroxide, t-butyl perbenzoate, dicumyl peroxide, potassium persulfate, aluminum trichloride, boron trifluoride, etherate complexes, titanium tetrachloride, n-butyllithium, t-butyllithium, cumylpotassium, 1,3-trilithiocyclohexane and the like. The polymerization of styrene, alone, or in the presence of one or more monomers copolymerizable with styrene is well known and it is considered unnecessary to further discuss the polymerization process. The styrenic polymers having a molecular weight of at least 15,000, preferably at least 50,000, and most preferably, 150,000 to 500,000 are brominated in accordance with the present invention. Although styrenic polymers outside these molecular weight ranges can be brominated in accordance with the present invention, there is typically no economic advantage in so doing.

Substantially any Lewis acid catalyst can be employed in the bromination of styrenic polymers in accordance with the invention. Examples of suitable catalysts include the conventional Lewis acids, e.g., of the $AlCl_3$, $AlBr_3$, $FeCl_3$, $FeBr_3$, Fe, $SbCl_5$, $BF_3$, $TiCl_4$, $SnCl_4$, $ZnCl_2$, $CaBr_2$, CuBr or $I_2$ type, with the aluminum halides and iron halides, especially $FeCl_3$ and $AlCl_3$, being preferred.

The catalyst is employed in a catalytically effective amount. Preferably from about 0.1 to 7 weight percent of catalyst are employed, based on weight of styrenic polymer being brominated. Most preferably, from about 0.3 to about 2.0 weight percent of catalyst is employed. When using the preferred ferric chloride and aluminum chloride catalyst, the especially preferred ranges are 0.6 to 0.9, particularly 0.75 weight percent for ferric chloride and 0.8 to 1.2, particularly 1.0 weight percent for aluminum chloride.

Any of the known brominating agents can be employed in the practice of the invention, including HBr oxidized in situ, BrCl and $Br_2$, with $Br_2$ being the currently preferred brominating agent. The brominating agent is employed in an amount sufficient to provide the desired amount of bromine, in the range from 1 to 71, preferably 43 to 71, and particularly 60 to 71 percent by weight of bromine, in the brominated polymer product. For example, approximately a 1:1 molar ratio of bromine to styrenic monomer unit is employed to achieve a 43 weight percent bromine content in the product. Higher degrees of bromination require larger amounts of bromine, for example, to obtain 61 weight percent bromine in a polystyrene product requires a molar ratio of approximately 2:1. In other words, the optimum amount of brominating agents is a stoichiometric amount with respect to the desired end product.

The bromination of styrenic polymers in accordance with the invention is preferably effected in the presence of at least one compound in which the styrenic polymeric material is soluble, with halogenated solvents being preferred. Suitable solvents include carbon tetrachloride, chloroform, tetrachloroethane, methylene chloride, dichloroethane, trichloroethylene, trichlorobenzene, methylene bromide, 1,2-dibromoethane and dichloro-difluoro methane. The bromination solvent must be one in which the styrenic polymers starting material is soluble and is most preferably one in which the Lewis acid catalyst is also soluble, readily dispersed or readily suspended. Methylene chloride is currently the preferred bromination solvent. The mixture of Lewis acid catalyst and solvent will be referred to hereafter as a catalyst dispersion, it being understood that the term is intended to cover dispersions, suspensions, gels, solutions and the like of the Lewis acid catalyst in the solvent.

To carry out the bromination process according to the invention, the Lewis acid catalyst is at least dispersed in a suitable inert organic solvent, preferably a halogenated solvent in which the styrenic polymer to be halogenated is soluble, in a suitable reaction vessel, preferably a stirred reactor which may be equipped in appropriate instances with a gas sparger. The brominating agent preferably is added as a solution of the brominating agent in an inert halogenated solvent. Alternatively, it can be added in gaseous form, and can be mixed with an inert gas, such as nitrogen, but this variant is less desirable. The styrenic resin is added as a solution in an inert halogenated solvent, preferably the same solvent in which the catalyst is dispersed.

It is important that at least a portion of the brominating agent be dispersed substantially throughout the catalyst dispersion before there is any substantial complexing of the styrenic polymer with the catalyst. For more active Lewis acid catalysts, such as aluminum chloride, this will require adding at least a portion, on the order of at least 5 mole percent, of the brominating agent to the catalyst dispersion before addition of the polymer solution to the reaction zone is begun. For less active catalysts, such as iron chloride, preaddition of the brominating agent is not necessary but is preferred. In this instance (less active catalyst), it is possible to preadd up to 20 mole percent of the polymer solution before beginning the addition of the brominating agent without encountering substantial complexing of the polymer with catalyst, providing there is no lapse of time between the preaddition of the polymer solution and the initiation of the addition of brominating agent; however, it is preferred to begin the addition of the brominating agent and the polymer solution separately but substantially simultaneously to the reaction zone, with such addition continuing, at least for some time concurrently, until the total amount of each component is charged to the reaction vessel. In the former case (more active catalyst), addition of the polymer solution is begun following the preaddition of the brominating agent.

Shortly after the addition of the styrenic resin solution is commenced, addition of any additional brominating agent is begun, with the addition of the styrenic polymer solution and additional brominating agent continuing, at least for some time concurrently, until the total amount of each component is charged to the reaction vessel.

The amount of brominating agent which is preadded to the catalyst dispersion prior to the addition of any styrenic polymer solution is thus influenced in part by the activity of the bromination catalyst, and will be in the range from 0 to 100 mole percent, preferably at least 5 mole percent, more preferably in the range from 7 to 100 mole percent and most preferably in the range of 7 to 50 mole percent. As pointed out, supra, with less active catalysts, such as ferric chloride, it is not necessary to preadd brominating agent to the catalyst dispersion; however, it is preferred to add at least 5 molar percent of the brominating agent to minimize formation of insoluble end products. The more active catalysts, such as aluminum chloride, necessitate the preaddition of at least a portion, e.g., 5 mole percent, of the brominating agent to the catalyst dispersion.

The styrenic polymer solutions typically will contain from 10 to 50, preferably 15 to 40, weight percent styrenic polymer with an overall styrenic polymer to solvent concentration such that the total styrenic polymer and total solvent from all sources in the reaction will be in the range from 5 to 40, preferably 25 to 35, especially 35, weight percent styrenic polymer. At styrenic polymer concentrations above 40 weight percent, the viscosity of the styrenic solutions, particularly at the higher styrenic polymer molecular weights, can be too high for commercial recovery and the bromination process becomes uneconomical where the styrenic polymer solutions comprise less than 5 weight percent styrenic polymer.

The bromination is effected at temperatures preferably in the range of 0°–0° C. over a time period in the range of 1–3 hours, preferably 1–2 hours. After completion of the reaction, the product is recovered following conventional procedures. A particularly attractive workup procedure includes deactivation of the reaction by adding a killing agent, such as water, to deactivate the catalyst, filtering the reaction mixture, separating the organic phase into hot water and flashing off the solvent to leave a slurry of brominated styrenic polymer in hot water. The brominated styrenic polymer is separated by filtration and dried.

The Examples and comparative experiments which follow are illustrative of the invention, and it is not intended to limit the invention to these examples. Parts and percentages are by weight, unless otherwise indicated.

COMPARATIVE EXAMPLE 1

Not An Embodiment Of The Present Invention

One molar quantity (104 g) of polystyrene having a weight average molecular weight of 218,000 and a molecular weight distribution of 2.8 was dissolved in 589 grams methylene chloride in a reaction vessel equipped with an agitator. To this solution was added and dispersed with agitation 0.78 grams ferric chloride Lewis acid catalyst. Bromine in an amount of 2 moles (320 g), based on moles of polystyrene, was added to the reaction vessel at a rate of approximately 0.77 moles/hour $Br_2$, with the temperature being maintained in the range from 3° to 5° C. Total contact time was 3.75 hours. The catalyst was deactivated by addition of water. The reaction mixture was filtered to remove a substantial amount of dark chunks of insoluble material. The filtered solution was washed four times with 800 ml water, neutralized with sodium hydroxide and washed again with water. The organic phase was dropped into agitated hot water held at 70° C. and the methylene chloride flashed off to leave a slurry of brominated polystyrene in hot water. The brominated polystyrene was separated from the water by filtration and dried. The 257 grams of dried product is brominated polystyrene and represents a 98 percent recovered yield of brominated polystyrene having a bromine content of 60.4 weight percent. The product has a 20 weight percent solution color of 8, a yellowness index of 25.8 and an alkyl halide content of 2360 ppm (parts per million) bromine.

COMPARATIVE EXAMPLE 2

Not An Embodiment Of The Present Invention

The procedure of Example 1 was repeated, except that 0.75 molar amount of polystyrene was dissolved in 702 grams methylene chloride and to this solution was added 1.0 grams ferric chloride Lewis acid catalyst. Bromination was effected with 1.87 moles of bromine, based on molar quantity of polystyrene at a rate of approximately 0.94 moles/hour $Br_2$ at a temperature of 2° to 5° C. Total contact time was 5.0 hours. The reaction was killed with water and the reaction mixture was filtered to remove a substantial amount of dark chunks of insoluble material. The filtered solution was worked up following the procedure of Example 1. There was recovered brominated polystyrene product containing 65.3 weight percent bromine representing a 95 percent recovered yield. The product has a 20 weight percent solution color of 8, a yellowness index of 25.2 and an alkyl halide content of 2500 ppm bromine.

COMPARATIVE EXAMPLE 3

Not An Embodiment Of The Present Invention

The procedure of Example 1 was repeated except that 1.0 gram aluminum chloride Lewis acid catalyst was employed. Total reaction contact time was 3.5 hours at a temperature in the range of 2° to 4° C. After filtering the reaction mixture to remove a substantial amount of dark chunks of insoluble material, the filtered solution was worked up as in Example 1 to yield a brominated polystyrene containing 61 weight percent bromine in a 98 percent recovered yield. The brominated polystyrene has a 20 weight percent solution color of 5 and a yellowness index of 19.7.

EXAMPLE 4

A reaction vessel equipped with an agitator was charged with 346 grams methylene chloride, 0.8 grams ferric chloride and 90 grams of bromine. The contents of the reaction vessel were cooled to 0° C. A one molar solution (104 grams) of the polystyrene described in Comparative Example 1 was added to the reactor over the course of 0.66 hours. Shortly after beginning the addition of the polystyrene solution, the addition of an additional amount of bromine was begun and continued concurrently with the addition of the polystyrene solution, with 240 grams of bromine being added over 1.5 hours. After a total reaction or contact time of 2 hours, the reaction was killed with water, the brominated polystyrene product mixture was filtered and otherwise worked up as in Example 1. No dark chunks of insoluble material were found. There was recovered 259 grams of brominated polystyrene having a bromine content of 61 weight percent, at a 99 percent recovered yield. The product color, by visual comparison, was lighter than that of Comparative Example 1.

EXAMPLE 5

A reaction vessel equipped with an agitator was initially charged as follows:

| Bromination run | 5-1 | 5-2 | 5-3 | 5-4 |
| --- | --- | --- | --- | --- |
| Methylene chloride, gms | 346 | 346 | 346 | 457 |
| Ferric chloride, gms | 0.8 | 0.8 | 0.8 | 0.8 |
| Bromine, moles | 0.0 | 0.2 | 0.5 | 0.2 |

A solution of one molar quantity (104 gms) of the polystyrene employed in Example 1 in 242 grams methylene was fed to the reactor. Shortly after beginning the addition of the polystyrene solution, addition of additional bromine was begun. Addition of the polystyrene solution and bromine continued concurrently to the completion of the addition.

Added charge to the reaction was as follows:

| Bromination run | 5-1 | 5-2 | 5-3 | 5-4 |
| --- | --- | --- | --- | --- |
| Polystyrene solution, moles/hr | 1.5 | 1.82 | 1.5 | 1.08 |
| Moles polystyrene added | 1.0 | 1.0 | 1.0 | 1.0 |
| Bromine, moles/hr | 1.2 | 1.5 | 0.96 | 1.22 |
| Moles Bromine added | 2.0 | 1.8 | 1.5 | 2.3 |
| Total contact time, hrs | 2 | 2 | 2 | 3 |
| Temperature, °C. | 0–7 | 1–6 | 0–10 | 0–5 |

After terminating the reaction with water, the product was filtered and otherwise worked up following the procedure of Example 1. Brominated polystyrene product was obtained as follows:

| Bromination run | 5-1 | 5-2 | 5-3 | 5-4 |
|---|---|---|---|---|
| Insoluble | none | very few | none | few |
| Alkyl halides as Bromine, ppm | — | 1570 | — | — |
| % recovered yield | 98 | 98 | 99 | 93 |
| Bromine content, wt % | 61 | 60.7 | 61 | 66 |
| 20 wt % solution color | S.S | 6 | 6 | 6.5 |
| Yellowness Index | 26.5 | 26.3 | 26.7 | 26.0 |

EXAMPLE 6

Polystyrene was brominated following the procedure of Example 4, using aluminum chloride as the bromination catalyst. The reaction was initially charged as follows:

| Bromination run | 6-1 | 6-2 | 6-3 | 6-4 | 6-5 |
|---|---|---|---|---|---|
| Methylene chloride, gms | 346 | 346 | 346 | 346 | 487 |
| Aluminum chloride, gms | 1.0 | 1.0 | 1.0 | 1.0 | 1.0 |
| Bromine, moles | 0.0 | 0.2 | 0.5 | 2.0 | 0.2 |

A solution of one molar quantity (104 gms) of the polystyrene employed in Example 1 in 242 grams methylene chloride was added to the reactor. Shortly after beginning the addition of the polystyrene solution, addition of an additional amount of bromine was begun and continued concurrently with the addition of the polystyrene solution, except for bromination run 8-4, where no additional bromine was added. Added charge to the reaction was as follows:

| Bromination run | 6-1 | 6-2 | 6-3 | 6-4 | 6-5 |
|---|---|---|---|---|---|
| Polystyrene solution moles/hr | 1.82 | 3.03 | 1.14 | 0.83 | 1.52 |
| Moles polystyrene added | 1.0 | 1.0 | 1.0 | 1.0 | 1.0 |
| Bromine, moles/hr | 1.28 | 1.64 | 2.0 | 0.0 | 1.29 |
| Moles bromine added | 2.0 | 1.8 | 1.5 | 0.0 | 2.3 |
| Total contact time, hrs | 2 | 2 | 2 | 2 | 3 |
| Temperature, °C. | 2-6 | 0-7 | 0-8 | 0-5 | 0-5 |

After terminating the reaction with water, the product was filtered and otherwise worked up following the procedure of Example 1. Brominated polystyrene product was recovered as follows:

| Bromination run | 6-1 | 6-2 | 6-3 | 6-4 | 6-5 |
|---|---|---|---|---|---|
| Brominated polystyrene, % recovered yield | 98 | 97 | 95 | 95 | 94 |
| Insolubles | many | few | few | none | few |
| Bromine content, wt % | 61 | 60.5 | 60.7 | 61 | 66 |
| 20 wt % solution color | 45 | 4 | 5 | 5 | 6 |
| Yellowness Index | 21.4 | 24.1 | 20.6 | | 27.4 |

As can be seen from the data of the examples, the bromination process of this invention provides a product having a more desirable color; substantially reduces, if not entirely eliminating, the formation of undesirable insoluble materials, reduces the extent of side chain bromination, and generally results in a substantial reduction in reaction time. For example, when ferric chloride is employed as a bromination catalyst, the invention process (Examples 4 and 5) provides products having better color (cf. Solution Color) than are provided by a typical prior art process (Examples 1 and 2), and a lower alkyl halide content at shorter reaction times, as well as a significant reduction in the amount of insoluble materials. Similar results are obtained when aluminum chloride is employed as the bromination catalyst (cf. invention process Example 6 and noninvention or prior art process Example 3). In addition, Example 6 also demonstrates the necessity for contacting the catalyst suspension with brominating agent before contacting the catalyst suspension with polymer (cf. bromination run 6-1 and bromination runs 6-2 through 6-5 for amount of insoluble materials which must be filtered from the brominated product).

In view of the foregoing description, those of ordinary skill in the art may envision various modifications which would not depart from the inventive concepts disclosed herein. The scope of protection afforded is to be determined by the claims which follow and the breadth of interpretation that the law allows.

The embodiments of the invention in which an exclusive property or privilege is claimed are defined as follows:

1. A process for ring-brominating styrenic polymer comprising introducing a brominating agent and a styrenic polymer solution separately into contact with a Lewis acid catalyst dispersion and dispersing at least a portion of said brominating agent substantially throughout said catalyst dispersion before there is any substantial complexing of said styrenic polymer with said catalyst.

2. A process according to claim 1 wherein the amount of said Lewis acid catalyst is in the range of 0.1 to 7 percent by weight, based upon the weight of said styrenic polymer which is to be brominated, and said brominating agent provides a stoichiometric amount of bromine with respect to the number of styrenic monomer units of said styrenic polymer, which styrenic monomer units are to be brominated.

3. A process according to claim 2 wherein said brominating agent provides one to three moles of bromine for each mole of styrenic monomer units to be brominated.

4. A process according to claim 3 wherein from 5 to 100 molar percent of said brominating agent is dispersed throughout said Lewis acid catalyst dispersion before there is any substantial contact of said dispersion with said styrenic polymer solution.

5. A process according to claim 4 wherein said Lewis acid catalyst comprises aluminum chloride.

6. A process according to claim 2 wherein from 5 to 100 molar percent of said brominating agent is dispersed throughout said Lewis acid catalyst dispersion before there is any substantial contact of said dispersion with said styrenic polymer solution.

7. A process according to claim 6 wherein the Lewis acid catalyst comprises aluminum chloride.

8. A process according to claim 1 wherein from 5 to 100 molar percent of said brominating agent is dispersed throughout said Lewis acid catalyst dispersion before there is any substantial contact of said dispersion with said styrenic polymer solution.

9. A process according to claim 8 wherein said Lewis acid catalyst comprises aluminum chloride.

10. A process according to claim 1 wherein from 0 to 100 percent by weight of said brominating agent is dispersed into said Lewis acid catalyst dispersion concurrently with introduction of said styrenic polymer solution into said Lewis acid catalyst dispersion.

11. The process according to claim 10 wherein said Lewis acid catalyst comprises ferric chloride.

12. A process according to claim 11 wherein the amount of said Lewis acid catalyst is in the range from 0.1 to 7 percent by weight, based upon the weight of said styrenic polymer which is to be brominated, and said brominating agent provides a stoichiometric amount of bromine with respect to the number of styrenic monomer units of said styrenic polymer, which styrenic units are to be brominated.

13. A process according to claim 12 wherein said brominating agent provides two moles of bromine for each mole of styrenic monomer units to be brominated.

14. A process according to claim 1 wherein the amount of said Lewis acid catalyst is in the range from 0.1 to 7 percent by weight, based upon the weight of said styrenic polymer which is to be brominated, and said brominating agent provides a stoichiometric amount of bromine with respect to the number of styrenic monomer units of said styrenic polymer, which styrenic monomer units are to be brominated.

15. A process according to claim 14 wherein said brominating agent provides two moles of bromine for each mole of styrenic monomer units to be brominated.

16. A process for ring-brominating styrenic polymers comprising:

forming a dispersion of at least one Lewis acid catalyst in at least one first inert halogenated solvent;

separately and simultaneously contacting said Lewis acid dispersion with a solution of styrenic polymer in at least one second halogenated solvent and at least one brominating agent for a time and at a temperature to produce a nuclear-brominated styrenic polymer; and separately recovering said nuclear-brominated styrenic polymer.

17. A process according to claim 16 wherein the amount of said Lewis acid catalyst is in the range of 0.1 to 7 percent by weight, based upon the weight of styrenic polymer in said styrenic polymer solution and said brominating agent provides a stoichiometric amount of bromine with respect to the number of styrenic monomer units of said styrenic polymer, which styrenic monomer units are to be brominated.

18. A process according to claim 17 wherein said brominating agent provides one to three moles of bromine for each mole of styrenic monomer units to be brominated.

19. A process according to claim 18 wherein from 5 to 100 molar percent of said brominating agent is dispersed throughout said Lewis acid catalyst dispersion before there is any substantial contact of said catalyst dispersion with said styrenic polymer solution.

20. A process according to claim 19 wherein from 0 to 95 molar percent of said brominating agent is dispersed into said Lewis acid catalyst dispersion of at least for a time concurrently with introduction of said styrenic polymer into said catalyst dispersion.

* * * * *

UNITED STATES PATENT AND TRADEMARK OFFICE
CERTIFICATE OF CORRECTION

PATENT NO. : 4,975,496

DATED : December 4, 1990

INVENTOR(S) : Ronald G. Tigner and Edward R. Falardeau

It is certified that error appears in the above-identified patent and that said Letters Patent is hereby corrected as shown below:

Column 5, line 5, "0-0° C" should correctly read --0-10° C--.

Column 5, line 5, delete "L-".

Column 7, line 12, Table, "S.S" should correctly read --5.5--.

Column 7, line 60, Table, "45" should correctly read --4.5--.

Signed and Sealed this

Thirtieth Day of June, 1992

Attest:

DOUGLAS B. COMER

Attesting Officer

Acting Commissioner of Patents and Trademarks